United States Patent
Egger et al.

(10) Patent No.: US 9,342,480 B2
(45) Date of Patent: May 17, 2016

(54) APPARATUS AND METHOD FOR GENERATING VLIW, AND PROCESSOR AND METHOD FOR PROCESSING VLIW

(71) Applicant: Samsung Electronics Co., Ltd., Suwon-si (KR)

(72) Inventors: Bernhard Egger, Seoul (KR); Soo-jung Ryu, Hwaseong-si (KR); Dong-hoon Yoo, Seoul (KR); Il-hyun Park, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 18 days.

(21) Appl. No.: 14/064,497

(22) Filed: Oct. 28, 2013

(65) Prior Publication Data

US 2014/0052960 A1 Feb. 20, 2014

Related U.S. Application Data

(62) Division of application No. 12/706,006, filed on Feb. 16, 2010, now Pat. No. 8,601,244.

(30) Foreign Application Priority Data

Feb. 18, 2009 (KR) .................. 10-2009-0013532

(51) Int. Cl.
G06F 9/30 (2006.01)
G06F 15/82 (2006.01)
G06F 9/38 (2006.01)

(52) U.S. Cl.
CPC ............ G06F 15/82 (2013.01); G06F 9/30072 (2013.01); G06F 9/3853 (2013.01)

(58) Field of Classification Search
CPC ..... G06F 9/445; G06F 9/3853; G06F 9/3822; G06F 9/30072; G06F 15/82
See application file for complete search history.

(56) References Cited

U.S. PATENT DOCUMENTS

| | | | |
|---|---|---|---|
| 5,471,593 A * | 11/1995 | Branigin | 712/235 |
| 5,903,750 A | 5/1999 | Yeh et al. | |
| 5,922,065 A | 7/1999 | Hull et al. | |
| 5,974,537 A | 10/1999 | Mehra | |
| 6,237,077 B1 | 5/2001 | Sharangpani et al. | |
| 6,865,662 B2 * | 3/2005 | Wang | 712/24 |
| 6,910,123 B1 | 6/2005 | Bosshart | |
| 6,931,632 B2 | 8/2005 | Ramasamy et al. | |
| 6,944,853 B2 | 9/2005 | Topham | |
| 7,146,487 B2 | 12/2006 | Drabenstott et al. | |
| 7,284,241 B2 * | 10/2007 | Heishi et al. | 717/152 |
| 7,617,496 B2 | 11/2009 | Gonion | |
| 2004/0205326 A1 | 10/2004 | Sindagi et al. | |
| 2006/0004996 A1 | 1/2006 | Gonion | |
| 2007/0168645 A1 | 7/2007 | Grabner et al. | |
| 2009/0327674 A1 | 12/2009 | Codrescu et al. | |

FOREIGN PATENT DOCUMENTS

| | | |
|---|---|---|
| KR | 10-2007-0118705 | 12/2007 |
| WO | WO 2006/110905 A3 | 3/2006 |

* cited by examiner

Primary Examiner — Benjamin Geib
(74) Attorney, Agent, or Firm — NSIP Law

(57) ABSTRACT

An apparatus and method for generating a very long instruction word (VLIW) command that supports predicated execution, and a VLIW processor and method for processing a VLIW are provided herein. The VLIW command includes an instruction bundle formed of a plurality of instructions to be executed in parallel and a single value indicating predicated execution, and is generated using the apparatus and method for generating a VLIW command. The VLIW processor decodes the instruction bundle and executes the instructions, which are included in the decoded instruction bundle, in parallel, according to the value indicating predicated execution.

18 Claims, 7 Drawing Sheets

30

| pred | Instruction 1 | ... | Instruction n |

| pred | Instruction 1 |
| pred | Instruction 2 |
| pred | Instruction 3 |
| ... | ... |

APPARATUS AND METHOD FOR GENERATING VLIW, AND PROCESSOR AND METHOD FOR PROCESSING VLIW

CROSS REFERENCE TO RELATED APPLICATION

The present application is a divisional of pending U.S. application Ser. No. 12/706,006, filed on Feb. 16, 2010, which claims the benefit under 35 U.S.C. §119(a) of Korean Patent Application No. 10-2009-0013532, filed on Feb. 18, 2009, in the Korean Intellectual Property Office. The disclosures of U.S. application Ser. No. 12/706,006 and Korean Patent Application No. 10-2009-0013532 are incorporated herein by reference in their entireties.

BACKGROUND

1. Field

The following description relates to instruction processing, and more particularly, to processing of instructions to be executed by a very long instruction word (VLIW) processor.

2. Description of the Related Art

A very long instruction word (VLIW) processor includes a plurality of functional units which execute a plurality of instructions in parallel. A VLIW processor may be employed in a computer to reduce the time required to execute input instructions by distributing the input instructions among the plurality of functional units. For a software program to be executed by a VLIW processor, a plurality of instructions of the software program must be converted into one long instruction.

A compiler, which compiles an instruction word to be executed by a VLIW processor, tries to minimize the time required to execute a program by achieving optimum parallelism in the processor. However, instruction parallelism is limited by data dependency, control dependency due to branch instructions, resource conflicts, and the like. In particular, a branch instruction is a major limiting factor. In the case of a conditional branch instruction, the processing of the instruction is delayed while a condition is evaluated, thereby making continuous pipeline processing difficult because the next stage of the pipeline must wait until the delay is over.

Researches have been conducted to determine methods that overcome the performance limitations caused by branch instructions. One method suggested is predicated execution. In predicated execution, a compiler compiles an instruction word such that a conditionally executed instruction may be executed without using a branch instruction. For example, a determination may be made as to whether to execute an instruction based on a condition, and the branch instruction may be removed. For example, in predicated execution, if a condition is true, an instruction may be executed. If the condition is false, the instruction may not be executed. However, to support predicated execution, all instruction codes including non-predicated instructions must be generated as predicated instructions.

SUMMARY

In one general aspect, there is provided an apparatus for generating a very long instruction word (VLIW) command, the apparatus comprising a memory for storing an instruction set used to generate the VLIW, and a compiler for generating the VLIW command based on the instruction set, the VLIW command comprising an instruction bundle formed of a plurality of instructions to be executed in parallel and a single value indicating predicated execution for each of the plurality of instructions in the bundle.

The single value indicating predicated execution may correspond to an index of a predicate register file.

The single value indicating predicated execution may comprise one or several condition bits.

In another aspect, there is provided a method of generating a VLIW command, the method comprising storing an instruction set that is used to generate the VLIW command, and generating the VLIW command based on the instruction set, the VLIW command comprising an instruction bundle formed of a plurality of instructions to be executed in parallel and a single value indicating predicated execution for each of the plurality of instructions in the bundle.

The single value indicating predicated execution may correspond to an index of a predicate register file.

The single value indicating predicated execution may comprise one or several condition bits.

In another aspect, there is provided a VLIW processor comprising a VLIW fetch unit for fetching an instruction bundle which comprises a plurality of instructions to be executed in parallel and a single value indicating predicated execution of each of the plurality of instructions in the bundle, a decoder for decoding the instruction bundle, and a VLIW execution unit for executing, in parallel, the instructions included in the instruction bundle, according to the single value indicating predicated execution.

The single value indicating predicated execution may correspond to an index of a predicate register file.

The VLIW execution unit may comprise a predicate register file for storing a predicate value at each index, and a plurality of functional units executing the instructions, in parallel, according to the predicate value stored in the predicate register file at the index which corresponds to the single value included in the instruction bundle.

The functional unit may execute the instructions in parallel when the predicate value is a specified value.

The single value indicating predicated execution may comprise one or several condition bits.

The VLIW execution unit may comprises a processor status register for storing condition bits, a comparator for comparing the condition bits included in the decoded instruction bundle with the condition bits stored in the processor status register, and a plurality of functional units for executing the instructions, which are included in the instruction bundle, in parallel, based on the comparison result.

The functional unit may execute the instructions in parallel when the condition bits included in the decoded instruction bundle match the condition bits stored in the processor status register.

In another aspect, there is provided a method of processing a VLIW using a VLIW processor, the method comprising fetching an instruction bundle which comprises a plurality of instructions to be executed in parallel and a single value indicating predicated execution of each of the plurality of instructions in the bundle, decoding the instruction bundle, and executing the instructions, which are included in the instruction bundle, in parallel, according to the single value indicating predicated execution.

The single value indicating predicated execution may correspond to an index of a predicate register file.

The executing of the instructions may comprise selecting a predicate value stored in the predicate register file at the index that has the same value as the single value included in the instruction bundle, and executing the instructions in parallel according to the selected predicate value.

The executing of the instructions may be performed when the predicate value is a specified value.

The single value indicating predicated execution may comprise one or several condition bits.

The executing of the instructions may comprise comparing the condition bits included in the decoded instruction bundle with the condition bits stored in a processor status register, and executing the instructions, which are included in the instruction bundle, in parallel based on the comparison result.

The executing of the instructions may be performed when the condition bits included in the decoded instruction bundle match the condition bits stored in the processor status register.

Other features and aspects will be apparent from the following detailed description, the drawings, and the claims.

Figures 1, 2A:
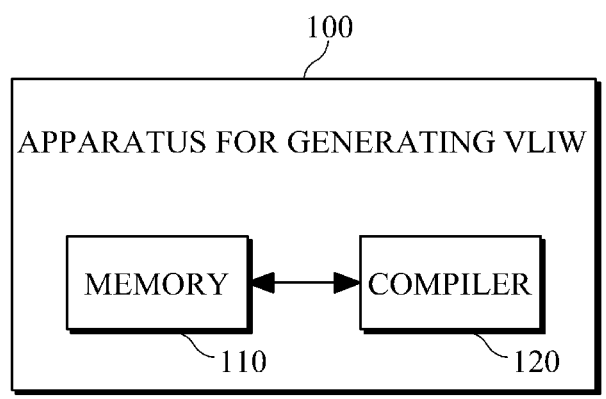
FIG. 1 is a diagram illustrating an example of an apparatus for generating a very long instruction word (VLIW)
FIGS. 2A and 2B are diagrams illustrating a conventional instruction set architecture and conventional VLIWs.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 illustrates an example of an apparatus for generating a very long instruction word (VLIW). Referring to FIG. 1, the apparatus 100 includes a memory 110 and a compiler 120. The memory 110 may also be implemented as an external memory.

The memory 110 stores an instruction set architecture (ISA) encoding map that may be used to generate a VLIW. The ISA encoding map defines the instruction structure of the instructions included in VLIW. For example, an instruction may include an opcode, two operand register indices, and an index of a register that will store a result value. Detailed elements of an instruction may vary according to the type thereof.

The compiler 120 generates a VLIW by converting a plurality of instructions into a VLIW instruction bundle, so that a VLIW processor (not shown) may process a software program. The instructions may be processed in parallel by a plurality of functional units included in the VLIW processor.

As described herein, a bundle refers to a group of "n" instructions that are to be executed in parallel by the VLIW processor, where n is a natural number. The compiler 120 generates a VLIW, also known as a VLIW instruction bundle, by referring to the ISA encoding map stored in the memory 110. The generated VLIW is stored in a region of the memory 110 and then fetched and executed by the VLIW processor.

Figure 2B:
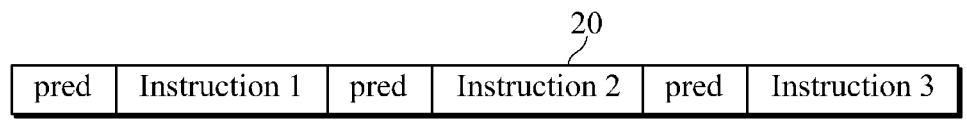

FIGS. 2A and 2B illustrate conventional ISA and VLIWs. Referring to an example ISA encoding map 10 illustrated in FIG. 2A, one or more bits of each instruction are reserved to indicate predicated execution.

A VLIW 20 illustrated in FIG. 2B includes three instructions that are to be executed in parallel by a VLIW processor having three functional units. For example, the VLIW instruction bundle 20 illustrated in FIG. 2B may have a total of 96 bits, and 15 bits of the 96 bits may be used for a value indicating predicated execution. For example, the bits used for indicating predicated execution may account for approximately 15% of each instruction bundle. However, the amount of bits used for indicating predicated execution may be any desired amount of bits, for example, 4 bit, 9 bits, 15 bits, 20 bits, and the like. However, only part of the VLIW executed by a VLIW processor needs predicated execution corresponding to a branch instruction. Thus, considering the limited width of a VLIW, it is inefficient to reserve a part of each instruction of the VLIW for a value indicating predicated execution.

The apparatus 100 may generate a VLIW command, which includes an instruction bundle. For example, the VLIW command may be formed of a plurality of instructions to be executed in parallel. The VLIW command may also include a single index value indicating predicated execution for each of the plurality of instructions included in the instruction bundle.

Figure 3A:
FIGS. 3A and 3B are diagrams illustrating an example of structures of VLIWs.
Figure 3B:

FIGS. 3A and 3B illustrate an example of structures of VLIWs.

While a value indicating predicated execution is included in each instruction of the VLIW 20 illustrated in FIG. 2B, it is instead only included once in each of the VLIWs 30 and 40 as illustrated in FIGS. 3A and 3B. The single index value may be used to indicate predicated execution for each of the plurality of instructions included in an instruction bundle.

In the VLIW 30 illustrated in FIG. 3A, an index "pred" of a predicate register file (PRF) has been encoded as the value indicating predicated execution for each instruction in the bundle. The PRF stores a predicate value for each index. When an index is input to the PRF, the PRF outputs a predicate value corresponding to the input index. Referring to FIG. 3A, the VLIW 30 includes the index "pred" of the PRF and a plurality of instructions that are to be executed in parallel. A compiler stores a result value of a VLIW for calculating a condition in the PRF and encodes the VLIW to use the stored result value.

A width of the index "pred" of the PRF may be determined by the number of predicate registers included in the PRF.

In the VLIW 40 illustrated in FIG. 3B, condition bits have been encoded as the value indicating predicated execution for each instruction in the bundle. Referring to FIG. 3B, the VLIW 40 includes the condition bits and a plurality of instructions that are to be executed in parallel. A width of a field including the condition bit may be determined by the number of conditions.

The condition bits are result values obtained by executing a condition that is generated when a condition operation is performed. A program may be, for example, "if (a<100) c=0," and the value generated by an instruction for calculating the condition "a<100" is may form the condition bits. When the generated value indicates that the condition is true, for example when a<100, "c" is replaced with zero. When the generated value indicates that the condition is not true, the value of "c" remains unchanged.

A register value stored in a processor status register (PSR) may include a plurality of flags indicating the status of a processor, such as a negative flag (N), a zero flag (Z), a carry flag (C), and an overflow flag (O). When a condition operation is performed, values of the flags are determined in the PSR. The values of the flags may correspond to condition bits. For example, two values may be compared, and when they match, the zero flag may be set.

As shown in FIGS. 3A and 3B, the VLIW may comprise one long instruction frame. The frame may include a plurality of instructions each stored in a different segment of the frame. The one long instruction frame may include a single segment, for storing a single value that may be used to determine predicative execution for each of the plurality of instructions stored in the one long instruction frame.

In some embodiments, condition bits indicating the execution result of a condition may be stored at a position of the PSR, and the stored condition bits may be compared with the condition bits of an input instruction. The instruction may be executed only when the compared condition bits match.

Figure 4:
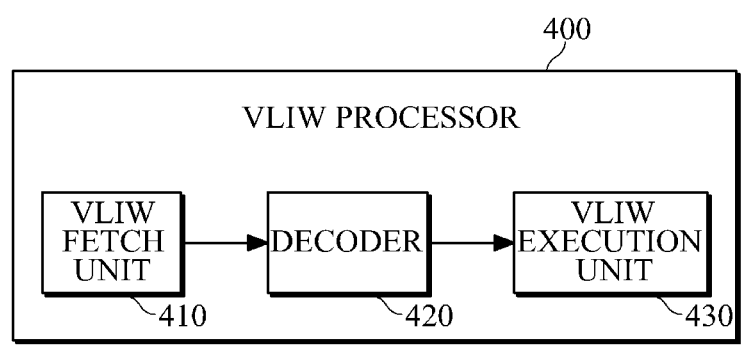
FIG. 4 is a diagram illustrating an example of a VLIW processor.

FIG. 4 illustrates an example of a VLIW processor. Referring to FIG. 4, the VLIW processor 400 includes a VLIW fetch unit 410, a decoder 420, and a VLIW execution unit 430.

The VLIW fetch unit 410 fetches an instruction bundle from a VLIW memory (not shown. The instruction bundle includes an index value indicating predicated execution and a plurality of instructions to be executed in parallel. The decoder 420 decodes the fetched instruction bundle. The VLIW execution unit 430 executes, in parallel, the instructions included in the decoded instruction bundle.

The VLIW execution unit 430 may or may not execute the instructions according to the value indicating predicated execution. The VLIW execution unit 430 includes a plurality of functional units that execute a plurality of instructions in parallel. For example, each functional unit may execute one instruction per cycle. The VLIW execution unit 430 may further include a multiplexer, a register which determines whether to execute a VLIW based on a value indicating predicated execution, and a register file which stores execution results.

The VLIW execution unit 430 may include a PRF. When a VLIW including an index of the PRF indicating predicated execution is fetched, a predicate value, which corresponds to the index extracted by decoding the VLIW, may be selected from the PRF. The VLIW execution unit 430 may determine whether to execute the VLIW according to the selected predicate value.

The functional units of the VLIW execution unit 430 may be disabled, or no operation (NOP) instructions may be inserted into the functional units so that the functional units are unable to execute instructions. Alternatively, while the functional units of the instruction execution unit 430 may execute instructions every cycle, whether to record the execution results in a register file (not shown) may be determined based on a predicate value. For example, when a predicate value is one, the VLIW execution unit 430 may record the instruction execution results of the functional units in a register file. When the predicate value is zero, the VLIW execution unit 430 may not record the instruction execution results in the register file as if no execution were performed.

When the VLIW execution unit 430 does not include the PRF, it may use a processor status register (PSR) which indicates the status of a processor. For example, when a VLIW having condition bit values indicating predicated execution is fetched, the VLIW execution unit 430 may compare the condition bits extracted by decoding the VLIW with the condition bits stored at a specified position of the PSR. The VLIW execution unit 430 may determine whether to execute the VLIW based on the comparison result.

The functional units of the VLIW execution unit 430 may execute instructions every cycle, every other cycle, every third cycle, and the like. Whether to record the instruction execution results in a register file may be determined based on whether the condition bits extracted by decoding a VLIW match the condition bits stored at a specified position of the PSR. For example, if the condition bits extracted by decoding the VLIW match the condition bits stored at the specified position of the PSR, the instruction execution results may be recorded in the register file. If not, the instruction execution results may not be recorded in the register file.

Figure 5:
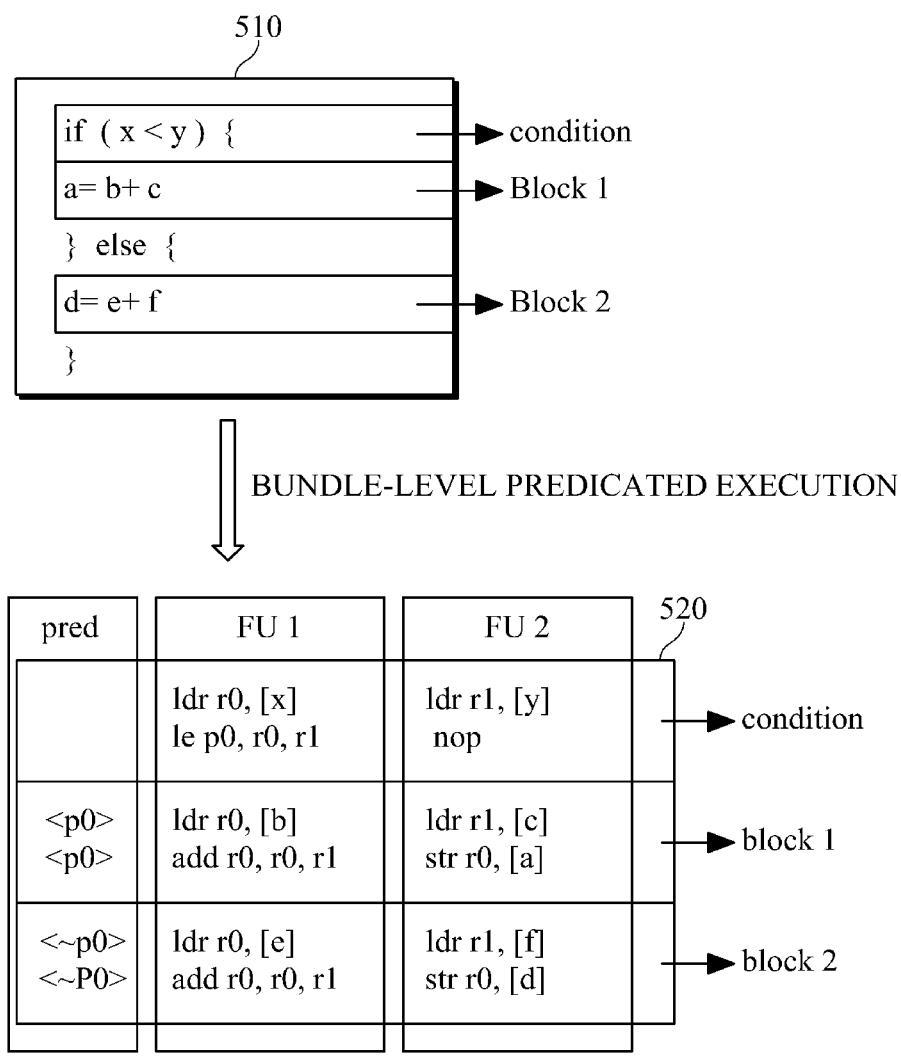
FIG. 5 is a diagram illustrating an example use of a predicated VLIW.

FIG. 5 illustrates an example use of a predicated VLIW.

In FIG. 5, an upper block 510 is an example of a conditional branch instruction. For example, if a condition that "x" is smaller than "y" is satisfied, an instruction in block 1 may be executed. If the condition is not satisfied, an instruction in block 2 may be executed.

A lower block 520 indicates a VLIW generated by a compiler using a predicated execution method. The VLIW is generated for use by a VLIW processor that includes two functional units for executing two instructions in parallel. The result of comparing "x" and "y" based on a condition is stored in a register p0.

When a condition that "x" is smaller than "y" is satisfied, a value stored in the register p0 is <p0>. For example, an instruction in block 1 may be executed, and the result of executing the instruction may be stored in the register p0. Meanwhile, executing an instruction in block 2 has no effect.

When the condition that "x" is smaller than "y" is not satisfied, the value stored in the register p0 is <~p0>. In this case, executing the instruction in block 1 has no effect. Thus, no result value is recorded in the register p0. However, an instruction in block 2 may be executed, and the execution result may be stored in the register p0.

When a value indicating predicated execution is included in each instruction of a VLIW bundle as illustrated in FIG. 2B, each functional unit of a VLIW processor has to evaluate the value indicating predicated execution. Meanwhile, the value indicating predicated execution is included in each VLIW bundle in the apparatus described herein. Thus, it is not necessary for each functional unit of a VLIW processor to evaluate the value indicating predicated execution.

In addition, there is no need to reserve a field of each instruction to encode index information ("pred") or a condition bit for a condition value. Thus, a bit field, which may have been used for the index information or the control bit, may be used for another purpose. For example, the bit field may be used to designate instruction codes, and more instructions may be defined and used in the VILW. In another example, the bit field may be used for operands. And a register file including more operand registers than a conventional register file may be used.

Figure 6:
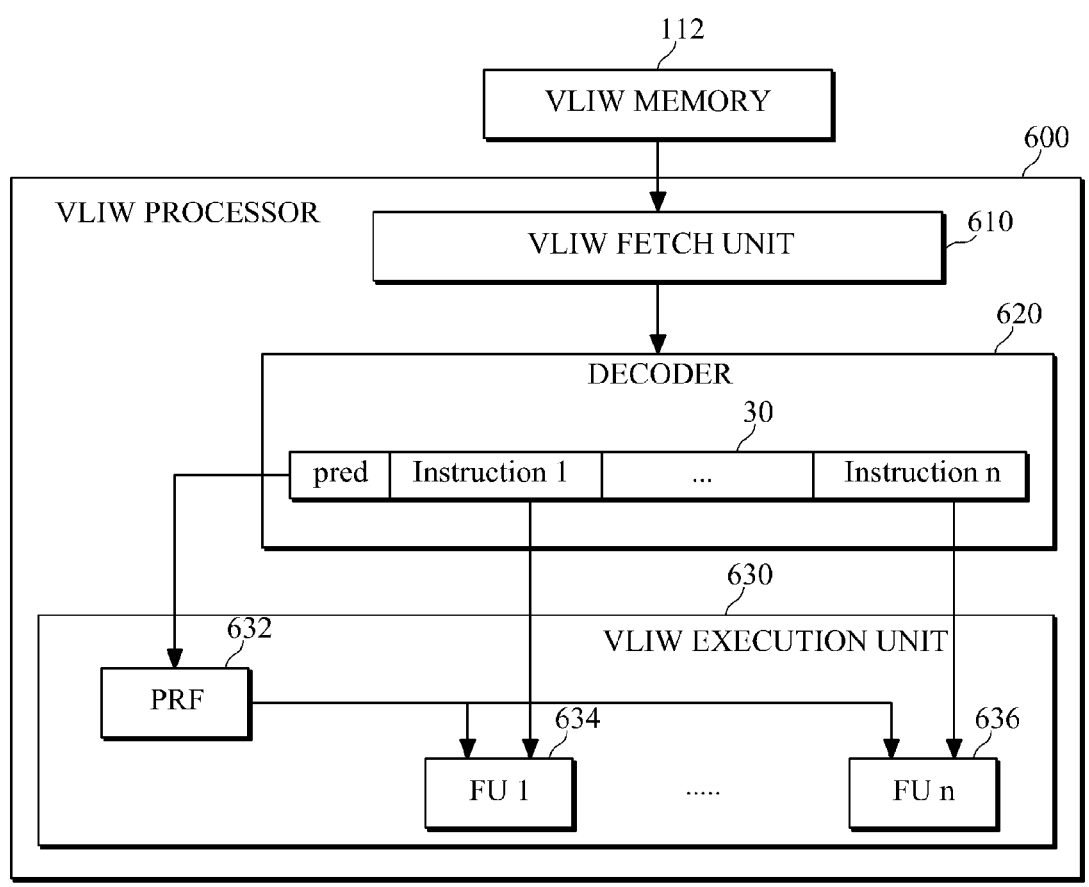
FIG. 6 is a diagram illustrating another example of a VLIW processor.

FIG. 6 illustrates another example of a VLIW processor. The VLIW processor 600 illustrated in FIG. 6 includes a PRF 632. The VLIW processor 600 may be used when a VLIW is fetched and includes an index of the PRF 632 indicating predicated execution.

Referring to FIG. 6, the VLIW processor 600 fetches a VLIW from a VLIW memory 112. The VLIW memory 112 may be a cache or an external memory. The VLIW processor 600 includes a VLIW fetch unit 610, a decoder 620, and a VLIW execution unit 630. The VLIW execution unit 630 includes the PRF 632 and a plurality of functional units 634 and 636. Although not shown in FIG. 6, the VLIW execution unit 630 may further include storage for storing the instruction execution results of the functional units 634 and 636, for example, a register file.

The VLIW fetch unit 610 fetches a VLIW 30 which includes an index of the PRF 632 indicating predicated execution. The decoder 620 decodes the VLIW 30.

The PRF 632 stores predicate values for each index. When the index included in the VLIW 30 is sent to the PRF 632, a predicate value corresponding to the index of the PRF 632 is selected and outputted from the PRF 632. The functional units 634 and 636 may execute in parallel, a plurality of instructions that are included in the VLIW 30. When the predicate value corresponding to the index of the PRF 632 is set to a specified value, for example, zero, the functional units 634 and 636 may execute the instructions in parallel.

Figure 7:
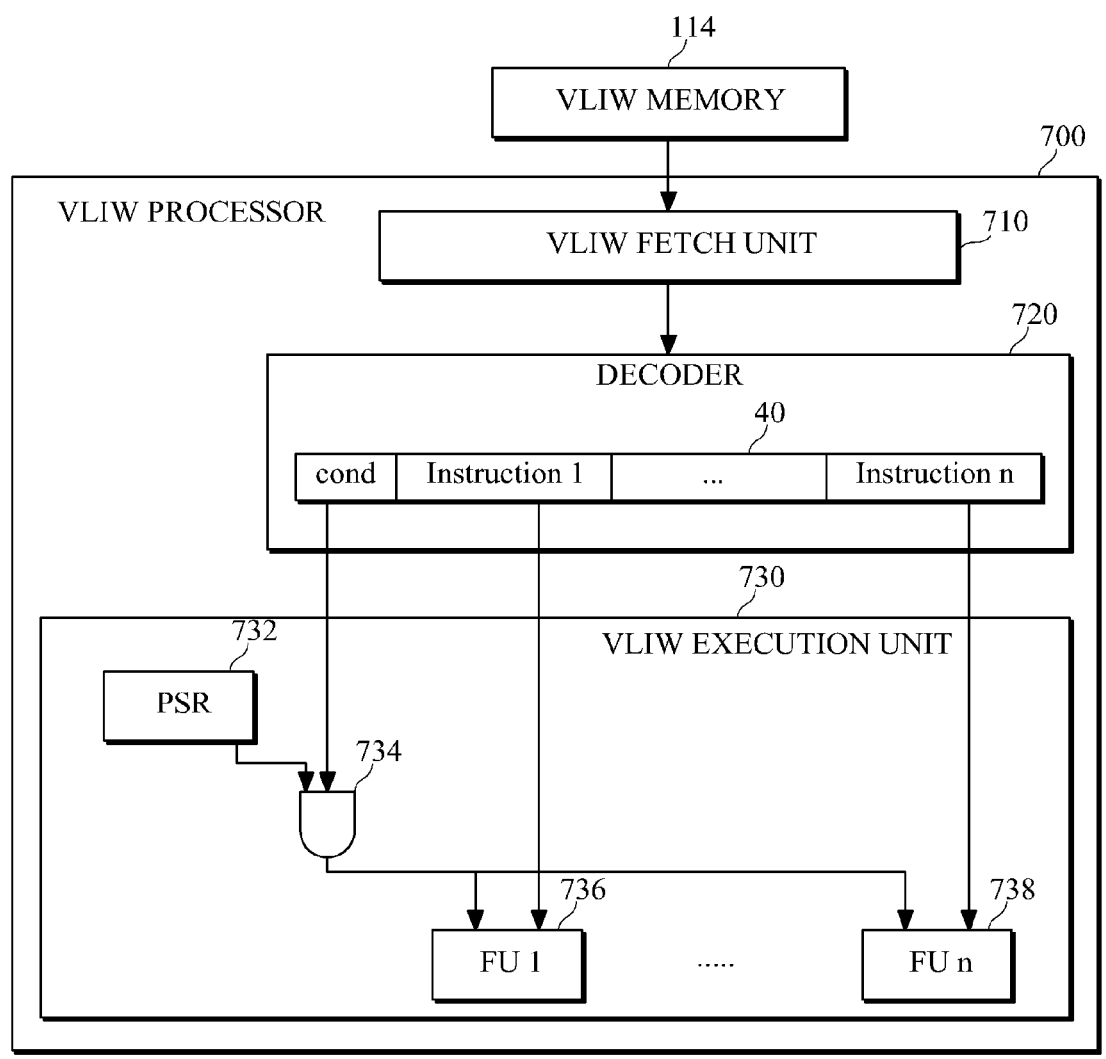
FIG. 7 is a diagram illustrating another example of a VLIW processor.

FIG. 7 illustrates another example of a VLIW processor. The VLIW processor 700 illustrated in FIG. 7 may be used when a VLIW is fetched and includes condition bits as a value indicating predicated execution. The VLIW processor 700 may use a PSR 732 to determine whether to execute instructions. The PSR 732 indicates the status of the VLIW processor 700.

Referring to FIG. 7, the VLIW processor 700 fetches a VLIW 40 from a VLIW memory 114. The VLIW memory 114 may be, for example, a cache memory, an external memory, and the like. The VLIW processor 700 includes a VLIW fetch unit 710, a decoder 720, and a VLIW execution unit 730. The VLIW execution unit 730 includes the PSR 732, a comparator 734, and a plurality of functional units 736 and 738.

The VLIW fetch unit 710 fetches the VLIW 40 which includes one or several condition bits encoded to indicate predicated execution. The decoder 720 decodes the VLIW 40.

The condition bit extracted by decoding the VLIW 40 and the condition bits located at a specified position of the PSR 732 are sent to the comparator 734. Then, the comparator 734 compares the extracted condition bits with the condition bits stored at the specified position of the PSR 732. According to an embodiment, when these condition bits match, the functional units 736 and 738 may execute, in parallel, a plurality of instructions included in the VLIW 40.

Figure 8:
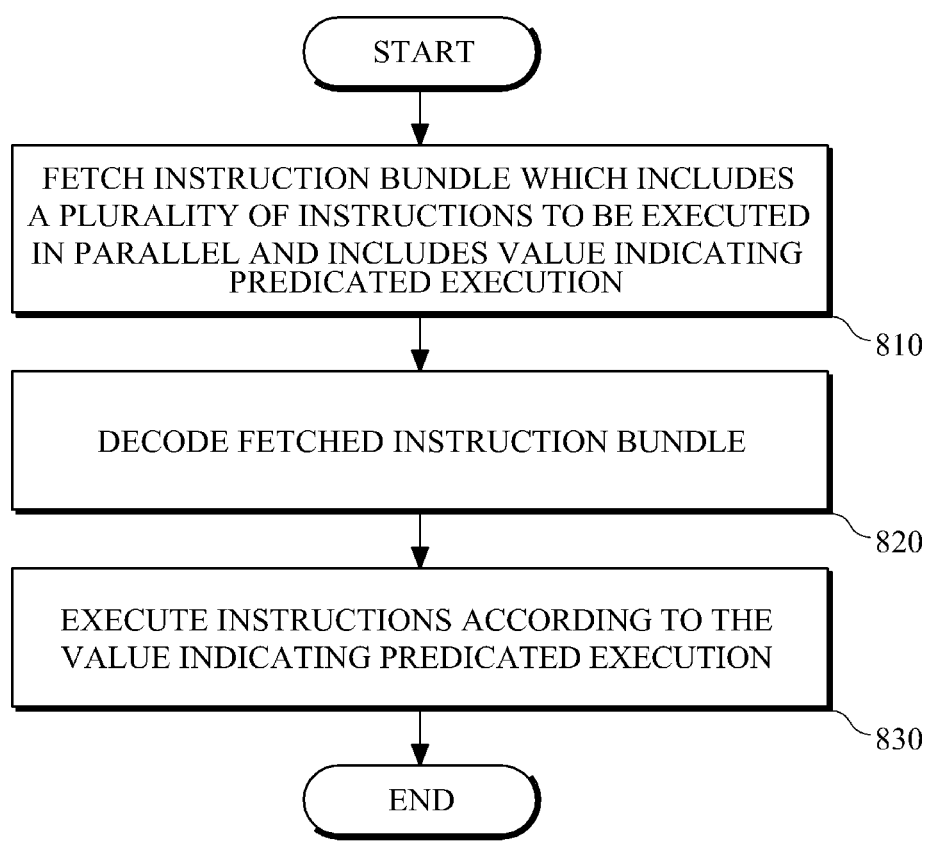
FIG. 8 is a flowchart illustrating an example of a method for processing a VLIW.

FIG. 8 is a flowchart illustrating an example of a method of processing a VLIW. Referring to FIG. 8, an instruction bundle, which includes a plurality of instructions to be executed in parallel and includes a value indicating predicated execution, is fetched in 810. The instruction bundle is decoded in 820. The instructions are executed in parallel in 830, according to the value indicating predicated execution which is extracted after the instruction bundle is decoded.

When the value indicating predicated execution is an index stored in a PRF, a predicate value corresponding to the index of the PRF included in the instruction bundle may be selected from the PRF, and the instructions may be executed in parallel according to the selected predicate value. For example, when the predicate value corresponding to the index of the PRF is set to a specified value, the instructions may be executed in parallel.

When the value indicating predicated execution comprises condition bits, the condition bits included in the decoded instruction bundle may be compared with the condition bits included in a PSR, and the instructions may be executed in parallel based on the comparison result. For example, when the condition bits included in the decoded instruction bundle match the condition bits included in the PSR, the instructions may be executed in parallel.

An instruction bundle, which includes a plurality of instructions to be executed in parallel and includes a value indicating predicated execution, is generated as a VLIW. Therefore, a VLIW may be generated efficiently, and the generated VLIW may be efficiently processed.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for generating a very long instruction word (VLIW) command, the apparatus comprising:
   a memory for storing an instruction set used to generate the VLIW; and
   a compiler for generating the VLIW command based on the instruction set, the VLIW command comprising an instruction bundle formed of instructions to be executed in parallel and a single value indicating predicated execution for all of the instructions in the bundle, wherein the single value indicates whether the instructions in the bundle are executed.

2. The apparatus of claim 1, wherein the single value indicating predicated execution corresponds to an index of a predicate register file.

3. The apparatus of claim 1, wherein the single value indicating predicated execution comprises one or several condition bits.

4. The apparatus of claim 3, wherein the condition bits comprise encoded values generated by an instruction for calculating a condition that is generated when a condition operation is performed, and in response to the condition bits indicating that the condition is true, the apparatus performs predicated execution for each of the instructions in the bundle.

5. The apparatus of claim 4, wherein in response to the condition bits of the input instruction not matching the stored condition bits, the apparatus does not execute the input instruction.

6. The apparatus of claim 3, wherein the condition bits comprise stored condition bits at a position of a processor status register and condition bits of an input instruction, and in response to the condition bits of the input instruction matching the stored condition bits, the apparatus executes the input instruction.

7. The apparatus of claim 1, wherein the single value is included only once in the entire VLIW instead of being included in each of the instructions of the VLIW.

8. The apparatus of claim 1, wherein the predicated execution occurs separate from the apparatus recording instruction executing results in a register file.

9. The apparatus of claim 8, wherein in response to the condition operation being performed, values of flags corresponding to the condition bits are determined in a processor status register.

10. The apparatus of claim 1, wherein the single value does not indicate whether instruction execution results are written in a register file.

11. The apparatus of claim 1, further comprising extracted condition bits as a result of decoding the VLIW and stored condition bits at a position of a processor status register, wherein in response to the extracted condition bits and the stored condition bits matching, the apparatus records instruction execution results in a register file.

12. The apparatus of claim 11, wherein in response to the extracted condition bits and the stored condition bits not matching, the apparatus does not record instruction execution results in the register file.

13. The apparatus of claim 1, wherein the single value is included in each of the VLIW bundles so that each of functional units of a VLIW processor does not need to evaluate the single value.

14. The apparatus of claim 1, wherein each of the instructions comprises a bit field used to designate instruction codes or operands.

15. The apparatus of claim 1, comprising a processor, the processor comprising a VLIW fetcher, a decoder, and a VLIW execution unit, the VLIW execution unit comprising a predicate storage register, a comparator, and functional units, and wherein the VLIW fetcher is configured to fetch the VLIW and the decoder decodes the VLIW in response to the VLIW being fetched.

16. A method of generating a VLIW command, the method comprising:
   storing an instruction set that is used to generate the VLIW command; and
   generating the VLIW command based on the instruction set, the VLIW command comprising an instruction bundle formed of instructions to be executed in parallel and a single value indicating predicated execution for all of the instructions in the bundle, wherein the single value indicates whether the instructions in the bundle are executed.

17. The method of claim 16, wherein the single value indicating predicated execution corresponds to an index of a predicate register file.

18. The method of claim 16, wherein the single value indicating predicated execution comprises one or several condition bits.

\* \* \* \* \*